Patented Oct. 4, 1927.

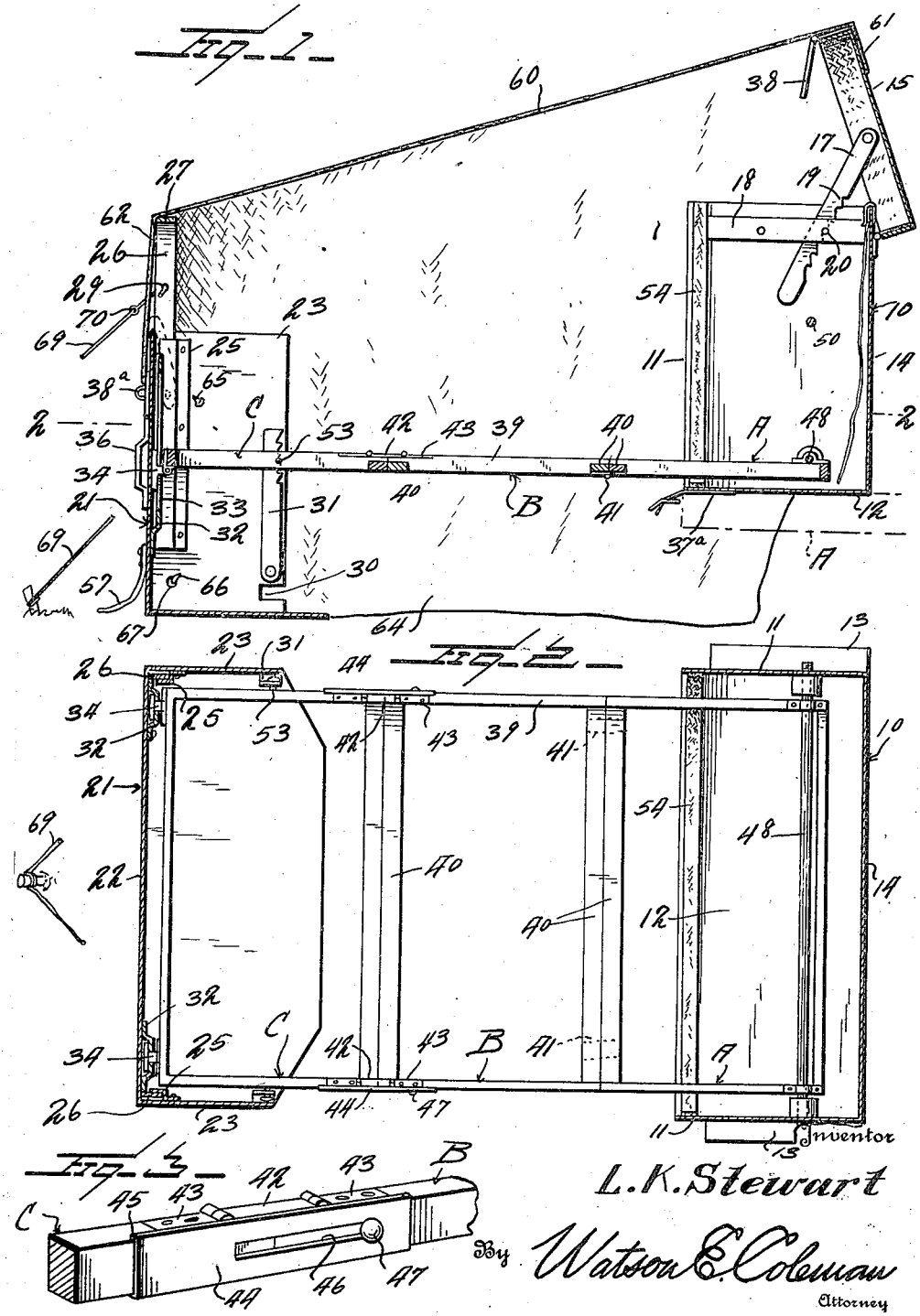

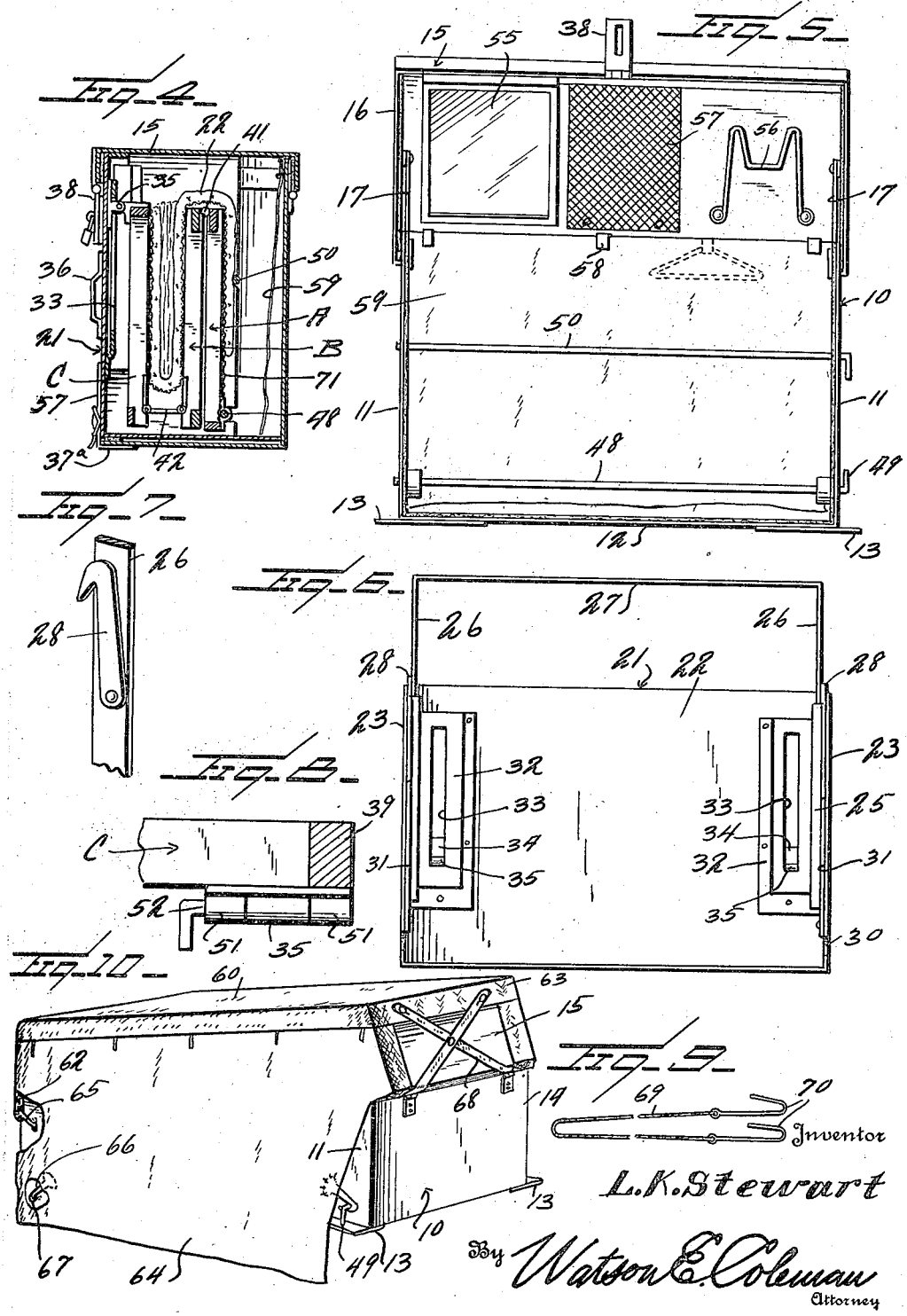

1,644,406

UNITED STATES PATENT OFFICE.

LEMON K. STEWART, OF NEWKIRK, OKLAHOMA.

CAMPER'S APARTMENT.

Application filed June 9, 1925. Serial No. 35,978.

This invention relates to camping outfits designed to be carried upon an automobile or truck in a folded up condition and when unfolded to provide a bed structure and certain other features, as will be later stated.

The general object of the invention is to provide a very simple and compact device of this character which has a main body portion supported upon the running board of the automobile and a section which is detachable from engagement therewith and shiftable outward, there being a foldable frame and bed mounted upon the two sections so that when one section is shifted outward from the other the bed will be unfolded.

A further object is to provide a structure of this character which provides not only for a bed but provides for the support of a tent over the bed, and further provides a wardrobe compartment wherein clothes may be carried, a mirror support, and a support for hats and other objects.

A still further object is to provide a device of this character from which the bed may be readily removed so as to permit the device to be used as a room with the flaps or flies of the tent either rolled up or allowed to fall.

Another object is to provide a device of this character which is so constructed that the body of the case ordinarily mounted upon the running board of the automobile may be supported upon the ground and the bed disposed at a proper height therein.

Still another object is to provide means whereby the bed may be disposed transversely readily, notwithstanding the fact that the device may be on uneven ground.

Other objects have to do with the details of construction and arrangement of parts as will appear more fully hereinafter.

My invention is illustrated in the accompanying drawings, wherein:—

Figure 1 is a vertical section through an automobile camping attachment showing the attachment opened out;

Figure 2 is a section on the line 2—2 of the construction shown in Figure 1;

Figure 3 is a fragmentary perspective view of two of the rails of a bed section showing the manner in which the foldable joint is made;

Figure 4 is a vertical section from front to rear showing the camping attachment folded up;

Figure 5 is a vertical section looking at the rear of the structure showing the lid raised;

Figure 6 is a vertical section looking at the foot supporting part showing the bow thereof lifted;

Figure 7 is a fragmentary perspective view showing one of the hooks for holding the bow raised;

Figure 8 is a fragmentary section showing the manner in which the bed frame is connected to the foot section;

Figure 9 is a fragmentary view of the bracing rope whereby the foot section is supported against strain;

Figure 10 is a perspective view showing the attachment with the tent in place.

Referring to the drawings, it will be seen that I have provided a case within which the bed and bed supporting structure is designed to be folded, this case including a body 10 which is designed to constitute the head, as it might be termed of the bed, this body 10 being adapted to rest upon the running board A of an automobile and be engaged therewith in any suitable manner. The case includes the sides 11 and the bottom 12, this bottom being formed with outwardly projecting base flanges 13 at each end. The back 14 of the case is attached to the ends and bottom in any suitable manner and preferably this case is formed of metal, though it will be understood that it might be formed of any other suitable material.

Hingedly attached to the back 14 at the upper edge thereof is the lid or cover 15 which has the downwardly extending, marginal flanges 16 and is held in an elevated position by means of the braces 17, these braces extending down inside of transversely extending strips 18 which are riveted, bolted or otherwise attached to the end walls 11 and the strip 17 being notched at intervals, as at 19, to engage with a pin or rivet 20. Thus the lid or cover may be adjusted as to height to any desired extent.

Coacting with the body or head section 10 is the foot section 21 which consists of the front wall 22 and the ends 23, these ends having a height equal to the height of the ends 11 of the body section, and the length of the section 21 is slightly less than the length of the body section 10 so that these end walls 23 will fit within the end walls 11 and the bottom 24 of the foot section will fit upon the bottom 12 of the body section 10. Attached to the end walls 23 are the vertical guide strips 25 and operating within these guide strips are the two legs 26 of an arch or cross bar 27, these legs 26 and cross bar 27 constituting a bow for the support of the tent, as will be later stated. These legs 26 are provided with pivoted latches 28 which, when the supporting bow is raised, catch over the rear wall 22 and thus support the bow in its raised position. This bow is preferably formed with oppositely disposed perforations 29 with which the tent is engaged, as will be later stated.

The lower ends of the side walls 23 are cut away at 30 for a reason which will appear hereafter, and attached to the forward edges of these side walls and extending up parallel thereto and just inside thereof are the bed supporting strips 31 having downwardly and forwardly inclined notches in their edges and attached to the rear wall 22 are a pair of upwardly extending plates 32 each formed with a longitudinally extending slot 33. Operating behind each of these plates and guided thereby is a slide 34 having an outwardly projecting hinge bead 35 with which the forward end of the bed is engaged.

The section 22 is adapted to fit within the section 10 and when these two sections are fitted together and the lid is closed, the two sections and the lid together constitute a carrying case within which the bed, the tent, clothing, etc., are enclosed and housed. In order to conveniently pull out the front section, I provide a handle 36, and in order to close these sections and hold them closed together I provide a strap section 37 which is adapted to engage with a second strap section 37ª on the floor 12 and I also provide the hasp 38 adapted to engage with the eye 38ª on the member 22 and be held in engagement therewith by means of a padlock.

Normally disposed in a folded condition within the section 10 but unfoldable into extended position is a bed supporting frame consisting of three sections A, B and C. Each of the sections is rectangular in form and is formed of the longitudinal members 39 and transverse members 40. The section A is hinged to the section B by means of a hinge 41 which permits the section B to be swung downwardly with relation to the section A so that the two sections A and B may be swung into parallel relation or into aligned relation as shown.

The sections B and C are connected by means of a double hinge, as shown in Figure 3, consisting of a relatively long hinge plate or leaf 42, and pivoted to the ends of this plate 42 are the leaves 43 which are attached in any suitable manner to the sections B and C but inward of the ends of these sections so that when these sections are turned into a horizontal position these projecting ends will be disposed beneath the plate 42, as shown in Figure 3, and when the rails 39 of the sections B and C are turned up to a folded or vertical position the mattress and springs of the bed will be contained between these two sections B and C. The sections B and C are held in their horizontal position by means of slide clamps 44 each mounted upon one of the rails as, for instance, upon the rail B and slidable into position across the joint between the two rail sections B and C, each sliding clamp having flanges 45 which embrace the upper and lower edges of the bed rails, and each clamp plate is formed with a longitudinally extending slot 46, there being a screw 47 extending out from the bed section B and passing through this slot.

Thus it will be seen that when it is desired to fold these two sections into the relation shown in Figure 4, the clamps are withdrawn, and when it is desired to hold the two sections in alignment with each other the clamps are slid forward to engage the section C. The head end, as it may be called, of the bed sections is formed with eyes through which passes the transversely extending rod 48 which may have screw-threaded engagement at one end with the end wall 11 and pass through an aperture in the other end wall and be provided with a handle 49 whereby the rod may be manipulated. If it be desired to take out the bed section entirely, this rod may be withdrawn but normally the rod will be in place and constitute a pivot upon which the head section of the bed will turn. A second rod 50 which is also removably engaged in perforations in the end walls 11 is for the purpose of engaging the head section of the bed and lifting this head section where the casing 10 rests upon the ground. Where, however, the casing 10 rests upon the running board of an automobile, then the head section of the bed is engaged with the rod 48.

The foot section C is provided upon its under side and adjacent each side rail 39 with a pair of beads 51 spaced from each other a distance to receive the bead 35 which is mounted upon the corresponding slide 34. A bolt 52 is slidably disposed within the beads 51 and may be projected through the bead 35 or withdrawn from engagement with these beads 35, and when so withdrawn the foot section of the bed may be detached from its engagement with the slides 34 and by removing the transversely extending pin or rod 48, the supporting structure of the bed and the bed itself may be entirely removed from its engagement with the two sections of the casing. By forming the plates 32 with relatively long slots 33, the foot section of the case might be disposed on relatively low ground or in a hole and not at its normal position. Under these circumstances it is, of course, necessary that the foot section of the bed shall be supported on a level with the head section thereof and this is the purpose of the vertically disposed members 31 having the notches cut therein, the side rails of the bed section C being provided with outwardly projecting pins 53 which are adapted to engage in these notches. It will furthermore be obvious that in case the foot section of the bed is disposed on inclined ground, that is, inclined in the direction of the length of the automobile that one side of the bed frame may be engaged with the foot section of the casing at a higher level than the other side. In order to form a water-tight joint between the end and bottom walls of the section 10 and the end and bottom walls of the foot section, I form the head section just inward of the outer edges of the bottom and end walls with a felt packing 54 and the cover or lid is also provided with a felt packing 54 so that when the cover is closed there will be a water-tight engagement between the cover and the end walls of the case.

The cover is provided at one end with a mirror 55. The other end is preferably provided with a hat rack in the form of a clamp 56 or any other suitable apparel support, and between the hat clamp and the mirror 55 there is provided a catch-all 57 illustrated as formed of wire netting within which letters, papers, clothing or other matters may be placed in a folded condition. Attached to the upper margin of the back wall of the body 10 by clips 58 is a curtain 59 and clothes hangers may be engaged with the rear wall behind this curtain for the purpose of supporting clothes and keeping these clothes protected by the curtain.

Coacting with the structure which has been described is a tent which normally is folded up and disposed within the folds of the bed or behind the bed when it is folded up, this tent consisting of the top 60, the rear flap or wall 61 and the front flap 62. These front and rear flaps are relatively short and the top 60 extends downward at 63 and is stitched to these flaps 61 and 62 so as to form corner pockets, as it may be termed, within which the corners of the lid 15 are engaged and in which the corners of the supporting bow 27 are engaged. The downwardly extending portion 63 of the top 60 has attached thereto the side flaps or curtains 64 which under some circumstances may be rolled up and held by straps in an obvious manner or unrolled so that the bed structure is entirely enclosed, housed and protected from rain.

The end 62 is provided with hooks 65 adapted to engage in the apertures 29 of the bow 27 and with hooks 66 which are adapted to engage in apertures 67 formed in the end walls 23. The head end of the tent may be secured in place by means of a strap 68 which is attached to the side flaps and extends across the rear wall 14 beneath the lid. After this tent is put in position over the supporting structure, the lid 61 may be raised by means of the notched braces 17 until the tent has been placed under strain and is stretched tight. These braces will, of course, then engage the pins 20 and the tent will be held in its stretched condition. If desired, a guy rope 69 is provided which is provided with hooks 70 at its extremities to engage in the perforations 29 of the bow 27, this guy rope being engaged at its outer end around the take or any other suitable anchoring device, the guy rope thus assisting in holding the tent top stretched. This is particularly necessary where the bed structure is removed from within the casing, as when the bed structure is removed there will be nothing to hold the foot section in spaced relation to the head section and keep the tent taut and there would be a liability of the foot section moving toward the head section by tipping over. When the bed is removed, it is obvious that the tent structure may be used as a room or as an ordinary tent with the flaps either rolled up or allowed to fall, thus permitting this tent to be used as a sitting room for playing cards, dressing or for other purposes. The bottom 12 of the section 10 extends laterally outward, as at 13, so as to permit the device to be clamped upon a running board. Any other means for this purpose, however, may be used.

I do not wish to be limited to the bed which will be used with the bed supporting structure, but preferably a thin mattress 70 about two inches thick will be utilized, and a woven wire spring mattress 71 of any suitable construction will also be used. These two mattresses with the bed clothes are capable of being folded up when the sections B and C are disposed in parallel relation.

The use of this device will be evident from what has gone before. It is not believed necessary to recapitulate the manner in which the device is folded up and unfolded and otherwise utilized.

I claim:—

1. A camping attachment for motor cars including a cubical vertically extending head section open at one side and having a hinged lid at its top, a cubical foot section open at one side and adapted to telescope into the head section, a foldable supporting element operatively connected at its ends to the two sections acting to spread and hold the sections apart when unfolded, and a tent engaged at one end with the free end of the lid of the head section and at its other end with the foot section, the tent including side flaps, and means for engaging the side flaps with the head and foot sections.

2. A camping attachment for motor cars including a cubical vertically extending head section open at one side and having a hinged lid at its upper end, a cubical foot section open at one side and top and adapted to telescope into the head section, a bow slidably mounted on the foot section and movable into a raised position, means holding said bow in its raised position, and a tent supported at one end by the free end of the lid of the head section and at its other end by said bow, the tent including side flaps.

3. A camping attachment for motor cars including a cubical vertically extending head section open at one side and having a hinged lid, a cubical foot section open at one side and top and adapted to telescope into the head section, a bow slidably mounted on the foot section and movable into a raised position, means holding said bow in its raised position, a tent supported at one end by the free end of the lid of the head section and at its other end by said bow, the tent including side flaps, a foldable supporting element pivotally and detachably connected at its ends to the head and foot sections respectively and foldable when the head and foot sections are shifted into telescopic engagement with each other and acting to brace the foot section and preventing its movement toward the head section.

4. A camping attachment for motor cars including a cubical vertically extending head section open at one side and having a hinged lid, the lid being provided with braces engaging the ends of the head section whereby the lid may be adjusted into a plurality of angles, a cubical foot section open at one side and top and adapted to be telescoped into the head section, a tent adapted to be supported at one end by the free margin of the lid and at its other end by the foot section, and means for holding the foot section from movement toward the lid when the tent has been put in place, the angular adjustment of the lid serving to tighten the top of the tent and hold it taut.

5. A camping attachment for motor cars including a head section and a foot section, a foldable supporting element operatively connected at one end to the head section, means operatively connecting the foot of the supporting element to the foot section and permitting the element to be supported in a horizontal plane when the foot section is tilted either longitudinally or laterally including vertically disposed notched members carried by the foot section, and pins on the side rail of the supporting element which engage with said notches.

6. A camping attachment for motor cars including a cubical head section open at one side and having a top, a cubical foot section open at one side and top and adapted to be telescoped into the head section, a supporting element formed of a plurality of sections hingedly engaged with each other whereby the sections of the supporting element may be folded into parallel relation or disposed in a horizontal aligned relation, means for locking said sections in a horizontal position, and means on the foot section permitting the vertical adjustment of the foot section relative to the foot of the supporting element.

7. A camping attachment for motor cars including a vertically extending cubical head section open at one side and having a top, a cubical foot section open at one side and top and adapted to be telescoped into the head section and having end walls and a rear wall, the rear wall being provided with vertically extending slotted members, slides mounted in said slotted members for vertical movement, each slide having a bead projecting out through said slot, a supporting element comprising a plurality of foldable sections, one of the end sections being pivotally connected to the head section, the other end section having beads embracing the beads on the slides and having shiftable bolts adapted to pass through all of said beads to thereby pivotally connect the supporting elements to the said slides, vertical members carried by the end walls of the foot section and having a plurality of notches, and pins on the bed support adapted to engage in said notches.

8. A camping attachment for motor cars including a cubical head section open at one side and having a lid and provided with a pair of transversely extending rods disposed one above the other, a cubical foot section open at one side and top and adapted to be telescoped into the head section, a foldable supporting element adjustably connected to the foot support for vertical adjustment, the opposite end of the supporting element having means for connection with either of said rods.

9. A camping attachment for motor cars including a head section and a foot section, both of said sections having a cubical form but being open on their confronting faces and one of said sections being adapted to telescope within the other section, a supporting structure composed of a plurality of hingedly connected sections, the end sections of the support being hingedly connected to the head and foot sections, certain of the sections of the support being operatively hinged to an intervening spacing member whereby said sections may be turned into parallel spaced relation, and means on one of the sections engaging the other section and adapted to lock the sections in aligned relation.

In testimony whereof I hereunto affix my signature.

LEMON K. STEWART.